US012544719B2

(12) United States Patent
Osmundson

(10) Patent No.: US 12,544,719 B2
(45) Date of Patent: Feb. 10, 2026

(54) CERAMIC MEMBRANE FILTRATION ASSEMBLY WITH SEALING DEVICE AND RELATED METHODS

(71) Applicant: Nanostone Water Inc., Waltham, MA (US)

(72) Inventor: Paul Osmundson, Waltham, MA (US)

(73) Assignee: Acuriant Technologies, Inc., Boston, MA (US)

( * ) Notice: Subject to any disclaimer, the term of this patent is extended or adjusted under 35 U.S.C. 154(b) by 1657 days.

(21) Appl. No.: 16/304,536

(22) PCT Filed: Jul. 21, 2017

(86) PCT No.: PCT/US2017/043386
§ 371 (c)(1),
(2) Date: Nov. 26, 2018

(87) PCT Pub. No.: WO2018/018013
PCT Pub. Date: Jan. 25, 2018

(65) Prior Publication Data
US 2019/0291056 A1 Sep. 26, 2019

Related U.S. Application Data

(60) Provisional application No. 62/365,221, filed on Jul. 21, 2016.

(51) Int. Cl.
*B01D 63/06* (2006.01)
*B01D 71/02* (2006.01)
(Continued)

(52) U.S. Cl.
CPC .......... *B01D 63/066* (2013.01); *B01D 63/06* (2013.01); *B01D 71/05* (2022.08);
(Continued)

(58) Field of Classification Search
CPC ...... B01D 63/066; B01D 63/06; B01D 71/02; B01D 2313/025; B01D 2313/04;
(Continued)

(56) References Cited

U.S. PATENT DOCUMENTS 6,656,362 B1   12/2003   Kihara et al.
2006/0113235 A1   6/2006   Strohm et al.
(Continued)

FOREIGN PATENT DOCUMENTS

CN   1274298 A   11/2000
CN   1835788 A   9/2006
(Continued)

OTHER PUBLICATIONS

International Search Report & Written Opinion in corresponding Application No. PCT/US2017/043386, dated Oct. 18, 2017, pp. 1-24.
(Continued)

*Primary Examiner* — Richard C Gurtowski
(74) *Attorney, Agent, or Firm* — Fish & Richardson P.C.

(57) ABSTRACT

A ceramic membrane filtration assembly comprising a membrane assembly extending from a first membrane assembly end to a second membrane assembly end, where the membrane assembly is defined by a membrane assembly length, the membrane assembly including at least one membrane. At least one of the membranes have channels therein, and at least one channel has channel ends. The filtration assembly further includes at least one sealing device coupled with the membrane assembly adjacent to at least one of the first and second membrane assembly ends, where the sealing device has an inner and outer perimeter. The sealing device has a sealing feature disposed along the outer perimeter, and the inner perimeter of the sealing device is sealed with a portion of the membrane assembly.

22 Claims, 3 Drawing Sheets

(51) Int. Cl.
  *B01D 46/24* (2006.01)
  *B01D 69/08* (2006.01)
  *C04B 38/00* (2006.01)

(52) U.S. Cl.
  CPC .......... *B01D 46/2418* (2013.01); *B01D 69/08* (2013.01); *B01D 2201/62* (2013.01); *B01D 2313/025* (2013.01); *B01D 2313/041* (2022.08); *B01D 2313/083* (2013.01); *B01D 2313/201* (2022.08); *B01D 2313/21* (2013.01); *B01D 2313/44* (2013.01); *B01D 2315/10* (2013.01); *B01D 2321/04* (2013.01); *C04B 38/0006* (2013.01)

(58) Field of Classification Search
  CPC .......... B01D 2313/083; B01D 2313/20; B01D 2313/21; B01D 2313/44; B01D 2315/10; B01D 2321/04
  See application file for complete search history.

(56) References Cited

U.S. PATENT DOCUMENTS

| | | | |
|---|---|---|---|
| 2014/0014569 A1 | 1/2014 | Hirozawa et al. | |
| 2014/0251893 A1 | 9/2014 | Goebbert et al. | |
| 2014/0283683 A1* | 9/2014 | Oguro .................. | B01D 63/066 96/9 |
| 2014/0353239 A1* | 12/2014 | Lesan .................... | B01D 63/12 210/450 |
| 2015/0136689 A1 | 5/2015 | Butters et al. | |
| 2015/0182917 A1 | 7/2015 | Hosoya et al. | |
| 2016/0008763 A1 | 1/2016 | Roderick et al. | |
| 2016/0038373 A1* | 2/2016 | Ohlin .................... | A61J 1/1406 215/247 |
| 2018/0154313 A1 | 6/2018 | Osmundson et al. | |

FOREIGN PATENT DOCUMENTS

| | | | | |
|---|---|---|---|---|
| CN | 2885393 Y | 4/2007 | | |
| CN | 202289882 U | 7/2012 | | |
| CN | 103459003 A | 12/2013 | | |
| CN | 203408632 | 1/2014 | | |
| CN | 203663714 U | 6/2014 | | |
| CN | 204544007 U | 8/2015 | | |
| CN | 204619762 U | 9/2015 | | |
| DE | 102006060858 | 9/2008 | | |
| EP | 0581695 A1 | 2/1994 | | |
| FR | 2786109 A1 | 5/2000 | | |
| FR | 2854820 A1 | 11/2004 | | |
| JP | 2006-247438 | 9/2006 | | |
| WO | WO2007004265 A1 | 1/2007 | | |
| WO | WO2015/072513 | 5/2015 | | |
| WO | WO2016/112121 | 7/2016 | | |
| WO | WO-2016112121 A1 * | 7/2016 | .......... | B01D 63/082 |
| WO | WO 2018/018013 | 1/2018 | | |

OTHER PUBLICATIONS

Office Action in corresponding CN Application No. 201780039526.2 dated Sep. 24, 2021, pp. 1-10.
Office Action in corresponding CN Application No. 201780039526.2 dated Mar. 10, 2021, pp. 1-9.
International Preliminary Report on Patentability in International Appln. No. PCT/US2017/043386, dated Jan. 31, 2019, 9 pages.
Office Action in corresponding CN Application No. 201780039526.2 dated Dec. 30, 2021, 14 pages (with English Translation).
Office Action in corresponding EP Application No. EP 17749004.2 dated Aug. 6, 2020, 5 pages.
Office Action in corresponding SG Application No. SG 11201810388W dated Feb. 20, 2020, 6 pages.
Office Action in corresponding SG Application No. SG 11201810388W dated Jun. 27, 2021, 4 pages.
Extended European Search Report in European Appln No. 24174997.7, dated Oct. 4, 2024, 11 pages.
Bonding/Adhesives, 1st ed., Banduhn (ed.), Aug. 2004, p. 14, 3 pages.
NZL.Sika.com [online], "The Difference Between Sealants and Adhesives," Apr. 11, 2024, retrieved on Oct. 2024, retrieved from URL<https://nzl.sika.com/en/about-us/news/the-difference-between-sealants---adhesives.html>, 4 pages.

* cited by examiner

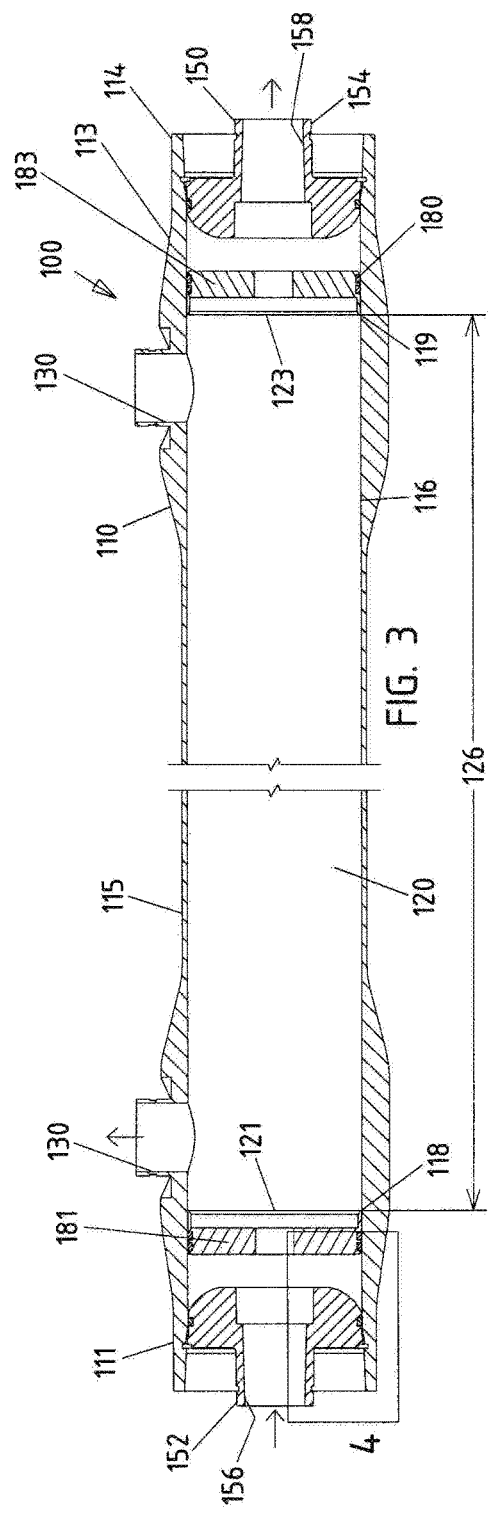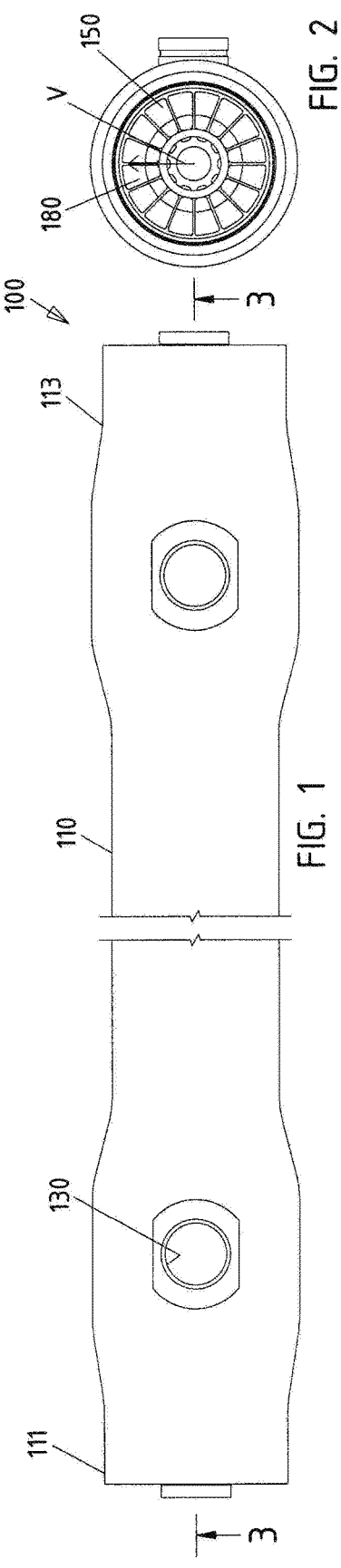

CERAMIC MEMBRANE FILTRATION ASSEMBLY WITH SEALING DEVICE AND RELATED METHODS

CROSS REFERENCE TO RELATED APPLICATIONS

This application is a 371 U.S. National Phase Application of PCT/US2017/043386, filed on Jul. 21, 2017, which claims priority to U.S. Provisional Application No. 62/365,221 that was filed on Jul. 21, 2016. The entire content of the applications referenced above are hereby incorporated by reference herein.

TECHNICAL FIELD

The present embodiments relate to a ceramic membrane filtration assembly with sealing device and related methods.

BACKGROUND

In the process of manufacturing filtration module assemblies, the assemblies can experience large range of temperatures which can affect the individual components within the assembly and their performance in the field. In addition, the filtration assembly has important sealing requirements which can also be affected during assembly. Still further, in the field there is limited amount of space for the filtration modules. What is needed is an improved method of manufacture of filtration assemblies, and improved filtration assemblies that address space constraints and cost of operating in the filtration assembly.

SUMMARY

A ceramic membrane filtration assembly comprising a membrane assembly extending from a first membrane assembly end to a second membrane assembly end, where the membrane assembly is defined by a membrane assembly length, the membrane assembly including at least one membrane. At least one of the membranes have channels therein, and at least one channel has channel ends. The filtration assembly further includes at least one sealing device coupled with the membrane assembly adjacent to at least one of the first and second membrane assembly ends, where the sealing device has an inner and outer perimeter. The sealing device has a sealing feature disposed along the outer perimeter, and the inner perimeter of the sealing device is sealed with a portion of the membrane assembly.

In one or more embodiments, the sealing device further includes structural members extending from an inner diameter of the sealing device.

In one or more embodiments, the structural members include an inner open section structural substantially aligned with a feed water input port.

In one or more embodiments, the structural members do not contact the membrane assembly ends such that a gap is between the structural members and the membrane assembly ends.

In one or more embodiments, the filtration assembly further includes a housing, the membrane assembly disposed within the housing, the housing having a first housing end and second housing end and a housing side therebetween, the housing having an outer circumference, the housing having an inner diameter, the sealing feature forms a seal between the housing and the sealing device.

In one or more embodiments, the sealing feature separates feedwater and permeate water.

In one or more embodiments, the housing has a feed port and at least one permeate output port.

In one or more embodiments, the at least one permeate output port exits the housing side.

In one or more embodiments, sealing between the sealing device and the housing occurs outside of the membrane assembly length.

In one or more embodiments, the filtration assembly further includes a first end cap disposed within the housing at a first end of the housing, the first end cap having a feed water input, a second end cap disposed within the housing at a second end of the housing, the second end cap having a concentrate port.

In one or more embodiments, the filtration assembly further includes two sealing devices, each sealing device disposed at each end of the housing, the permeate output port disposed between the two sealing devices fluidly separating permeate from feed water and concentrate solutions.

In one or more embodiments, the sealing device further includes a recessed portion disposed along the outer perimeter.

In one or more embodiments, the filtration assembly further includes a sealing member disposed within the recessed portion.

In one or more embodiments, the sealing device is coupled with the membrane such that there is a gap disposed between an end planar surface of the sealing device and the membrane assembly.

In one or more embodiments, the sealing feature comprises an O-ring.

In one or more embodiments, the sealing feature comprises two O-rings.

In one or more embodiments, a method of filtering water with the ceramic membrane filtration assembly as described herein, where the method includes pumping feed water in the through the first end cap, through the first sealing device and into the channels of the membrane assembly, and releasing permeate through the permeate outlet port.

In one or more embodiments, the method further includes periodically interrupting pumping with a reverse flow to clean the membrane assembly.

In one or more embodiments, the method further includes releasing concentrate through a concentrate port while segregating the feed water from the permeate and the concentrate with the sealing device.

BRIEF DESCRIPTION OF THE DRAWINGS

In the detailed description of the embodiments presented below, reference is made to the accompanying drawings, in which:

FIG. 1 illustrates a side view of a ceramic filtration assembly in accordance with one or more embodiments.

FIG. 2 illustrates an end view of a ceramic filtration assembly in accordance with one or more embodiments.

FIG. 3 illustrates a cross-sectional view of a ceramic filtration assembly taken along 3-3 of FIG. 1.

FIG. 4 illustrates an enlarged view of a portion of the ceramic filtration assembly taken at 4 of FIG. 1.

Figure 5:
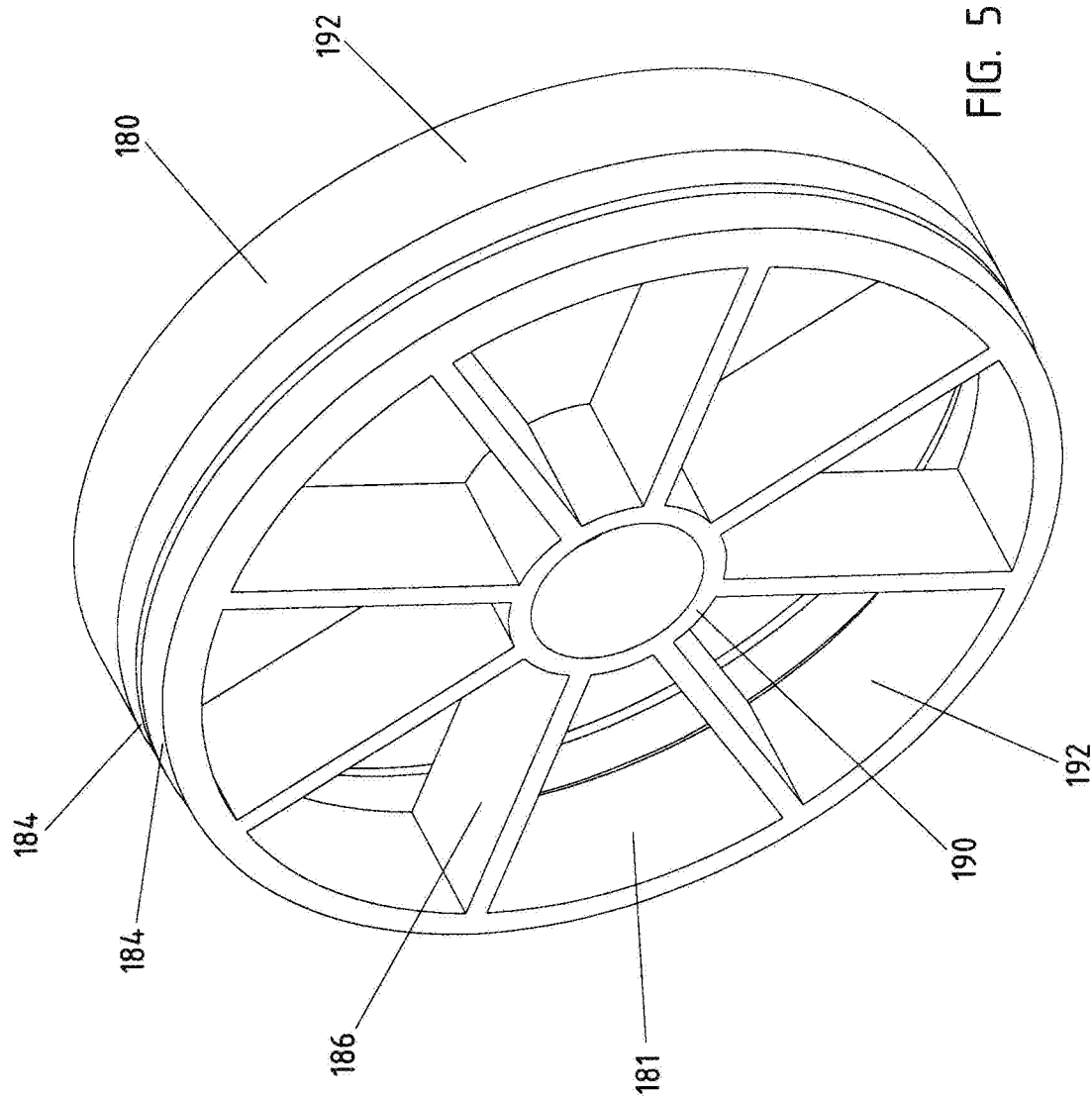
FIG. 5 illustrates a perspective view of a sealing device in accordance with one or more embodiments.

The present embodiments are detailed below with reference to the listed figures.

DETAILED DESCRIPTION OF THE EMBODIMENTS

In the following detailed description, reference is made to the accompanying drawings which form part of the description, and in which is shown by way of illustration specific embodiments in which the embodiments may be practiced. These embodiments are described in sufficient detail to enable those skilled in the art to practice the invention, and it is to be understood that other embodiments may be practiced in other ways. The following detailed description is not to be taken in a limiting sense, and the scope of the invention is defined by the appended claims and their equivalents.

The present embodiments relate to a ceramic membrane filtration assembly 100 which includes membrane module assembly 120, one or more sealing devices 180, and one or more end caps 150 (FIGS. 1, 3). The ceramic membrane filtration assembly 100 can be used for fluid processing and/or separation applications, for example, to treat water in a water treatment plant. In one or more examples, the filtration assembly 100 can be loaded in a basin, used for membrane bioreactor, used for waste affluence, or used in other process separation applications.

The filtration assembly 100 includes a membrane assembly 120 and a housing 110, where the housing 110 receives the membrane assembly 120 therein. The housing 110 extends from a first housing 111 end to a second housing end 113, and has a housing side 115, and a housing outer circumference. In one or more embodiments, the housing 110 includes one or more permeate outlet ports 130 and a feed port 132 therein. In one or more embodiments, the at least one permeate output port exits the housing side. The housing 110 is defined in part by an external housing surface 114 and an internal housing surface 116.

The ends 111, 113 of the housing 110 can be sealed with an end cap 150. In one or more embodiments, a first end cap 152 is disposed at an end 111 of the housing 110. In one or more embodiments, the first end cap 152 has a feed water input 156 into which untreated water flows, such as feed water. In one or more embodiments, a first end cap 152 is disposed at end 111 of the housing 110, and a second end cap 154 is disposed at second end 113 of the housing. In one or more embodiments, the second end cap 154 has a concentrate port 158, through which concentrate flows in the direction of the arrow.

Figure 6:
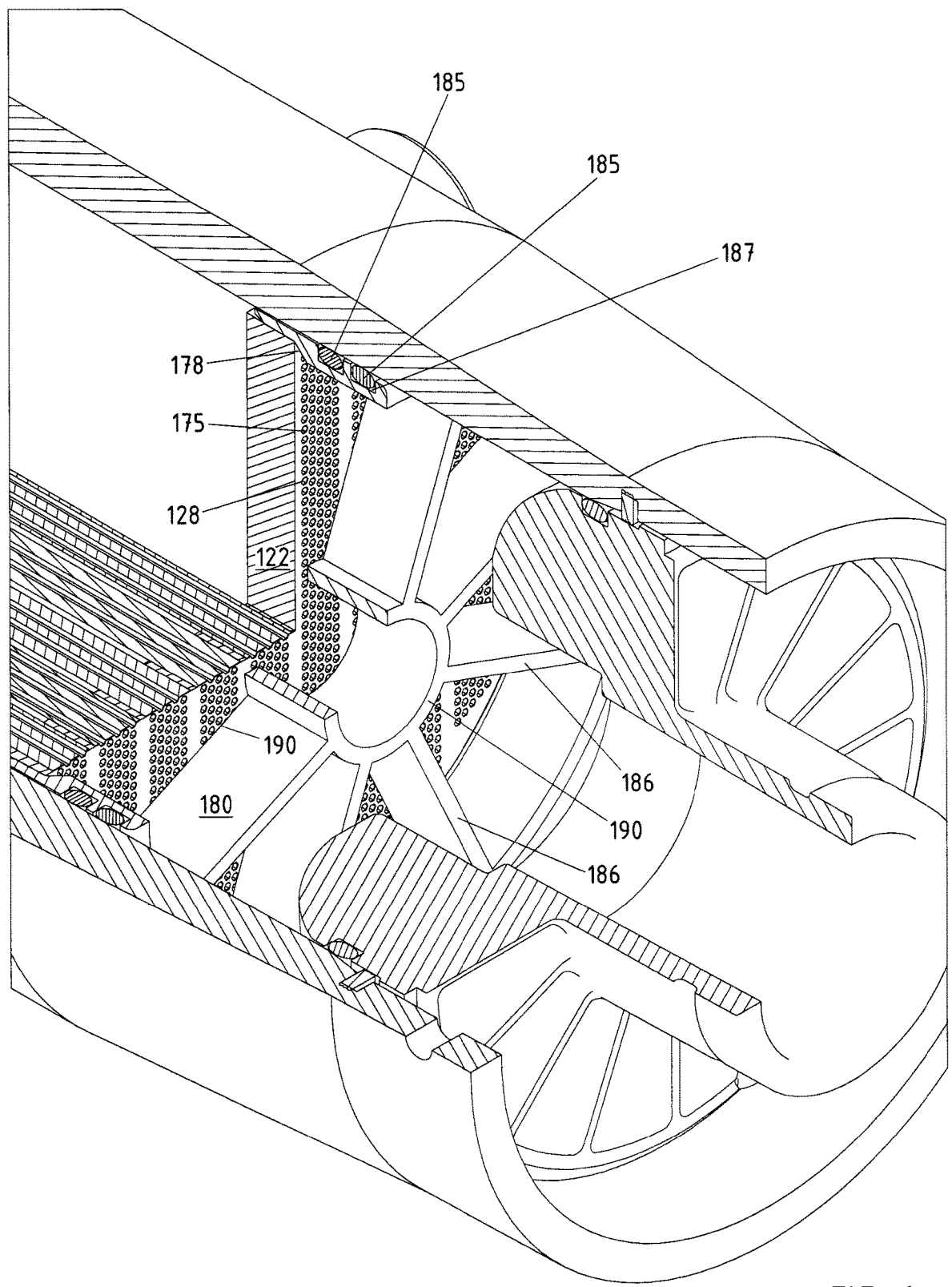
FIG. 6 illustrates a cross-sectional perspective view of a ceramic filtration assembly in accordance with one or more embodiments.

The membrane assembly 120, shown in FIG. 3, includes one or more membranes 122 (FIG. 6). The membrane assembly 120, in one or more embodiments, includes one or more of elongate membranes, tubular membranes, flat membranes, or plate membranes. The one or more membranes 122 extend from a first membrane end 121 to a second membrane end 123. The membranes 122 include one or more channels 128 therein. The membrane assembly 120 has a membrane assembly length 126, and extends from a first membrane assembly end 118 to a second membrane assembly end 119.

The filtration assembly further includes at least one sealing device 180, as shown in FIGS. 2, 5, and 6. In one or more embodiments, the sealing device 180 has a general ring shape, defined in part by a dimension r, where r is the radius of the sealing device 180. The sealing device 180 is further defined by an inner surface 192 and an outer surface 194. The sealing device 180 is further defined by an inner perimeter and an outer perimeter.

The at least one sealing device 180 further optionally includes a sealing portion 184, such as sealing features 187. In one or more embodiments, the at least one sealing device 180 includes two or more sealing portions 184 or two different recessed portions. In one or more embodiments, the sealing portion 184 includes a groove or recessed portion, for example, for an O-ring or elastomer. In one or more embodiments, two O-rings 185 are disposed in two different sealing portions 184. A seal can be further included, such as an elastomeric seal, and is disposed within the groove or recessed portion. In one or more embodiments, various shaped seals can be included such as conical seals, wedge shaped seals, O-rings, L-shaped seals, U-cup, Quad seals, packings, boot seals, cup seals, dynamic or static seals, adhesives, bonding and potting materials, welds, or others, or a combination thereof. A multiple seal configuration can also be included. Sealing surfaces can also be located in the housing as well as on the sealing device 180.

At least one sealing device 180 is disposed in the housing 110. In one or more embodiments, a first sealing device 181 is disposed at the first housing end 111, and a second sealing device 183 is disposed at the second housing end 113. In one or more embodiments, the sealing device 180 is sealed to the housing 110, such as to an internal housing surface and/or to the external housing surface. The sealing feature 187 separates feed water (untreated waster) and permeate (treated water). In one or more embodiments, two sealing devices 181, 183 are disposed in the housing 110, and each sealing device disposed at each end of the housing. The permeate output port 130 is disposed between the two sealing devices 181, 183 fluidly separating permeate from feed water and concentrate solutions. In one or more embodiments, sealing between the sealing device and housing occurs outside of the length 126 of the membrane assembly 120, as shown in FIG. 3.

The sealing device 180 includes one or more structural members 186. Within an inner diameter of the ring shape are the structural members 186, as shown in FIG. 5. Each sealing device 180 has a plurality of structural members 186 extending from the inner surface 181, where the structural members 186 are defined by a length 164. Other structural shapes could be used to reinforce the circumference of the sealing structure, provided they properly distributed the flow and properly reinforced the outside of the seal holder. The seal holder could also be a multiple piece assembly.

In one or more embodiments, the structural members 186 extend from an inner surface 181 and meet a center ring 190 of the sealing device. The structural members 186 assist in uniformly dispersing the feed water to the membrane assembly.

The at least one sealing device 180 is sealing with the membrane assembly 120 at an end surface projection 178 of the at least one sealing device 180. Since the feed water can only enter the channels of the membrane assembly 120, the permeate exits from the membrane assembly 120 to the permeate port, and the sealing device 180 is sealed against the housing, sealing device 180 assists in preventing the feed water from mixing with the clean permeate. In one or more embodiments, the end surface projection 178 is bonded with the membrane assembly 120. In one or more embodiments, there is a gap 175 disposed between the planar surface 177 of the sealing device 180 and the membrane assembly. In one or more embodiments, there is a gap 175 between the structural members and the membrane assembly, allowing for improved flow during the operation of the filtration assembly since the structural members do not block the ends of the membrane assembly.

The at least one sealing device 180 can be made by molding, printing, 3D printing, stamping, or machining, for example, from thermoplastic or metallic material. In one or more embodiments, the sealing device 180 is formed of glass filled, metal, and/or ceramic material. This will assist with chemical and structural stability during temperature swings during manufacturing or use, as temperatures can move over 100 degrees F.

In one or more embodiments, a method of filtering water with the ceramic membrane filtration assembly as described herein, where the method includes pumping feed water in the through the first end cap, through the first sealing device and into the channels of the membrane assembly, and releasing permeate through the permeate outlet port.

In one or more embodiments, the method further includes periodically interrupting pumping with a reverse flow to clean the membrane assembly.

In one or more embodiments, the method further includes releasing concentrate through a concentrate port while segregating the feed water from the permeate and the concentrate with the sealing device.

In one or more embodiments, a ceramic membrane filtration assembly includes a housing having a first housing end and second housing end, where the housing has an outer circumference and an inner diameter, and at least one permeate output port. The filtration assembly further includes a membrane assembly that extends from a first membrane assembly end to a second membrane assembly end. The membrane assembly includes at least one membrane, where each membrane extends from a first membrane end to a second membrane end, and the membrane assembly is disposed within the housing. Each membrane has channels therein, and the channels have channel ends.

The filtration assembly further includes a first and second end cap disposed within the housing at each end of the housing, where the first end cap has a feed water input, and the second end cap has a permeate output port. A sealing device is disposed at the first housing end near the first membrane assembly end of the membrane assembly, where the sealing device disposed between the membrane assembly and the end cap. The sealing device has an outer perimeter disposed adjacent to the inner diameter of the housing. The sealing device has a sealing feature disposed along the outer perimeter, where the sealing feature is sealed between the sealing device and the inner diameter of the housing, and the sealing device is sealed with an outer edge portion of the membrane assembly.

In one or more embodiments, the sealing device further includes structural members extending from an inner diameter of the sealing device.

In one or more embodiments, the structural members include an inner center circular structural substantially aligned with the feed water input port. In one or more embodiments, other geometric shapes could be used as structural members when they reinforce the outer circumference and allow proper distribution of flow to and from the membrane channels.

In one or more embodiments, the end cap and the sealing device are interfaced together.

In one or more embodiments, the end cap and sealing device are interfaced by one or more of snap fit, adhesive, or welding.

In one or more embodiments, the sealing member includes one or more filtrate gaps.

In one or more embodiments, the sealing device further includes a recessed portion disposed along the outer perimeter.

In one or more embodiments, a sealing member is disposed within the recessed portion.

In one or more embodiments, a ceramic membrane filtration assembly includes a housing having a first housing end and second housing end, where the housing has an outer circumference and an inner diameter, and a permeate output port. The assembly further includes a membrane assembly including at least one membrane, each of the at least one membrane extends from a first membrane end to a second membrane end, and the membrane assembly disposed within the housing. Each membrane has channels therein, and the channels have channel ends. A first end cap is disposed within the first housing end, and a second end cap is disposed within a second housing end. The first end cap has a feed water input, the second end cap has a concentrate port. A sealing device is disposed at each end of the membrane assembly, the sealing device disposed between the membrane assembly and each end cap, where the sealing devices have an outer perimeter disposed adjacent to the inner diameter of the housing. The sealing devices have a sealing feature disposed along the outer perimeter, the sealing feature is sealed with the inner diameter of the housing, and the sealing devices are sealed with ends of the membrane assembly.

In one or more embodiments, the sealing device further includes structural members extending from an inner diameter of the sealing device.

In one or more embodiments, the structural members include an inner center circular structural substantially aligned with the feed water input port.

In one or more embodiments, the end cap and the sealing device are interfaced together.

In one or more embodiments, the end cap and sealing device are interfaced by one or more of snap fit, adhesive, or welding.

In one or more embodiments, the sealing member includes one or more filtrate gaps.

In one or more embodiments, the sealing device further includes a recessed portion disposed along the outer perimeter.

In one or more embodiments, a sealing member is disposed within the recessed portion.

In one or more embodiments, a method of filtering water with the ceramic membrane filtration assembly includes pumping feed water in the through the first end cap, through the first sealing device, and into the channels of the membrane assembly, releasing permeate through the permeate outlet port, and releasing concentrate through the concentrate port while segregating the feed water from the permeate and the concentrate.

A ceramic membrane filtration assembly comprising a membrane assembly extending from a first membrane assembly end to a second membrane assembly end, where the membrane assembly is defined by a membrane assembly length, the membrane assembly including at least one membrane. At least one of the membranes have channels therein, and at least one channel has channel ends. The filtration assembly further includes at least one sealing device coupled with the membrane assembly adjacent to at least one of the first and second membrane assembly ends, where the sealing device has an inner and outer perimeter. The sealing device has a sealing feature disposed along the outer perimeter, and the inner perimeter of the sealing device is sealed with a portion of the membrane assembly.

In one or more embodiments, the sealing device further includes structural members extending from an inner diameter of the sealing device.

In one or more embodiments, the structural members include an inner open section structural substantially aligned with a feed water input port.

In one or more embodiments, the structural members do not contact the membrane assembly ends such that a gap is between the structural members and the membrane assembly ends.

In one or more embodiments, the filtration assembly further includes a housing, the membrane assembly disposed within the housing, the housing having a first housing end and second housing end and a housing side therebetween, the housing having an outer circumference, the housing having an inner diameter, the sealing feature forms a seal between the housing and the sealing device.

In one or more embodiments, the sealing feature separates feedwater and permeate water.

In one or more embodiments, the housing has a feed port and at least one permeate output port.

In one or more embodiments, the at least one permeate output port exits the housing side.

In one or more embodiments, sealing between the sealing device and the housing occurs outside of the membrane assembly length.

In one or more embodiments, the filtration assembly further includes a first end cap disposed within the housing at a first end of the housing, the first end cap having a feed water input, a second end cap disposed within the housing at a second end of the housing, the second end cap having a concentrate port.

In one or more embodiments, the filtration assembly further includes two sealing devices, each sealing device disposed at each end of the housing, the permeate output port disposed between the two sealing devices fluidly separating permeate from feed water and concentrate solutions.

In one or more embodiments, the sealing device further includes a recessed portion disposed along the outer perimeter.

In one or more embodiments, the filtration assembly further includes a sealing member disposed within the recessed portion.

In one or more embodiments, the sealing device is coupled with the membrane such that there is a gap disposed between an end planar surface of the sealing device and the membrane assembly.

In one or more embodiments, the sealing feature comprises an O-ring.

In one or more embodiments, the sealing feature comprises two O-rings.

In one or more embodiments, a method of filtering water with the ceramic membrane filtration assembly as described herein, where the method includes pumping feed water in the through the first end cap, through the first sealing device and into the channels of the membrane assembly, and releasing permeate through the permeate outlet port.

In one or more embodiments, the method further includes periodically interrupting pumping with a reverse flow to clean the membrane assembly.

In one or more embodiments, the method further includes releasing concentrate through a concentrate port while segregating the feed water from the permeate and the concentrate with the sealing device.

The assembly facilitates the ease of element assembly, and helps control temperature expansion and will facilitate the use of drop in elements in standard housing. The sealing device allows for the contraction and expansion when a predetermined thermoplastic and fill material are used. In addition, the sealing device provides a place to hold a seal and provides a sealing surface.

The fixture device aligns the ceramic membranes and allows the assembly to be efficiently assembled and sealed. It offers the benefit of allowing for expansion and contraction and facilitates external sealing of the membrane element to the wall of the housing in which it operates. The sealing used to separate the treated and untreated streams, for example, permeate and feed water, overcomes inner diameter tolerance issues in standard housings. The sealing features, such as the multiple O-rings, are able to withstand the pressure differentials over a much longer period of time.

The embodiments have been described in detail with particular reference to certain embodiments thereof, but it will be understood that variations and modifications can be effected within the scope of the embodiments, especially to those skilled in the art. It should be noted that embodiments or portions thereof discussed in different portions of the description or referred to in different drawings can be combined to form additional embodiments of the present invention. The scope of the invention should, therefore, be determined with reference to the appended claims, along with the full scope of equivalents to which such claims are entitled.

What is claimed is:

1. A membrane filtration assembly comprising:
    a membrane assembly extending from a first membrane assembly end to a second membrane assembly end, the membrane assembly comprising a ceramic membrane having channels therein;
    a sealing device coupled with the membrane assembly adjacent to at least one of the first and second membrane assembly ends; and
    a bonding material,
    wherein:
        the sealing device has an inner perimeter and outer perimeter;
        the sealing device has a sealing feature disposed along the outer perimeter;
        the sealing device comprises a center ring and structural members that extend from an inner surface of the sealing device to the center ring;
        the structural members do not contact the membrane assembly ends such that a gap is present between the structural members and the membrane assembly ends;
        the sealing device comprises an end surface projection extending from the sealing device in a longitudinal direction; and
        the bonding material is present between the inner perimeter of the sealing device defined by the end surface projection and a portion of a side of the membrane assembly along an outer perimeter of the membrane assembly so that the bonding material bonds the inner perimeter of the sealing device defined by the end surface projection to the portion of the side of the membrane assembly along the outer perimeter of the membrane assembly.

2. The filtration assembly as recited in claim 1, further comprising a housing, wherein:
    the membrane assembly is disposed within the housing;
    the housing has a first housing end, a second housing end and a housing side between the first and second housing ends; and the sealing feature forms a seal between the housing side and the sealing device.

3. The filtration assembly as recited in claim 2, wherein the sealing feature is configured to separate feed water and permeate water.

4. The filtration assembly as recited in claim 3, wherein the housing has a feed port and at least one permeate output port configured to allow permeate to exit the housing side.

5. The filtration assembly as recited in claim 2, wherein:
the membrane assembly has a membrane assembly length extending from the first membrane assembly end to the second membrane assembly end; and
the seal between the sealing device and the housing side is outside of the membrane assembly length.

6. The filtration assembly as recited in claim 2, further comprising a first end cap and a second end cap, wherein:
the first end cap is disposed within the housing at the first housing end;
the first end cap has a feed water input;
the second end cap is disposed within the housing at the second housing end; and
the second end cap has a concentrate port.

7. The filtration assembly as recited in claim 2, further comprising two sealing devices, wherein each sealing device is disposed at each end of the housing, and the permeate output port is disposed between the two sealing devices fluidly separating permeate from feed water and concentrate solutions.

8. The filtration assembly as recited in claim 1, wherein the sealing device further includes a recessed portion disposed along the outer perimeter.

9. The filtration assembly as recited in claim 8, wherein the sealing feature is disposed within the recessed portion.

10. The filtration assembly as recited in claim 1, wherein the sealing device is coupled with the ceramic membrane such that there is a gap disposed between an end planar surface of the sealing device and the membrane assembly.

11. The filtration assembly as recited in claim 1, wherein the sealing feature comprises an O-ring.

12. The filtration assembly as recited in claim 1, wherein the sealing feature comprises two O-rings.

13. The filtration assembly as recited in claim 1, further comprising a housing, wherein:
the membrane assembly is disposed within the housing;
the housing has a first housing end, a second housing end and a housing side between the first and second housing ends;
the housing has an inner diameter;
the sealing feature forms a seal between the housing and the sealing device; and
the sealing device further includes a recessed portion disposed along the outer perimeter.

14. The filtration assembly as recited in claim 13, wherein the sealing feature is disposed within the recessed portion.

15. The filtration assembly as recited in claim 9, wherein the sealing feature comprises an O-ring, and the sealing feature forms a seal between the housing side and the sealing device.

16. The membrane filtration assembly as recited in claim 2, wherein the structural members include an inner open section structure aligned with a feed water input port of the housing.

17. The filtration assembly as recited in claim 1, wherein:
the sealing device comprises first and second recessed portions disposed along the outer perimeter;
the sealing feature comprises first and second O-rings;
the first O-ring is in the first recessed portion; and
the second O-ring is in the second recessed portion.

18. A membrane filtration assembly, comprising:
a housing having a first housing end, a second housing end, and a housing side between the first and second housing ends;
a membrane assembly in the housing between the first and second housing ends, the membrane assembly comprising a plurality of ceramic membranes, each ceramic membrane having a plurality of channels therein;
a device comprising a center ring, an outer ring, and structural members extending between the center and outer rings;
and
a sealing feature disposed in a recessed portion of the outer ring so that the sealing feature seals the device to the housing side,
wherein:
the structural members do not contact the membrane assembly end such that a gap is present between the structural members and the membrane assembly end;
the device comprises an end surface projection extending from the device in a longitudinal direction; and
a bonding material is present between an inner perimeter of the device defined by the end surface projection and a portion of a side of the membrane assembly along an outer perimeter of the membrane assembly so that the bonding material bonds the inner perimeter of the device defined by the end surface projection to the portion of the side of the membrane assembly along the outer perimeter of the membrane assembly.

19. The membrane filtration assembly of claim 18, wherein:
the housing comprises an input port and an output port;
the input port is configured to allow feed water to enter the membrane filtration assembly;
the output port is configured to allow permeate water to exit the membrane filtration assembly; and
the sealing feature is configured to separate the feed water from the permeate water.

20. The membrane filtration assembly of claim 19, wherein the structural members define an open section of the device that is aligned with the input port.

21. The filtration assembly as recited in claim 1, wherein the bonding material comprises an adhesive, a potting material, or a combination thereof.

22. The membrane filtration assembly of claim 18, wherein the bonding material comprises an adhesive, a potting material, or a combination thereof.

* * * * *